US006202573B1

United States Patent
Bachik

(10) Patent No.: US 6,202,573 B1
(45) Date of Patent: Mar. 20, 2001

(54) APPARATUS AND PROCESS FOR CARBON REMOVAL FROM FLY ASH

(75) Inventor: Alan Bachik, Houston, TX (US)

(73) Assignee: U.S. Scientific, L.L.C., Houston, TX (US)

( * ) Notice: Subject to any disclaimer, the term of this patent is extended or adjusted under 35 U.S.C. 154(b) by 0 days.

(21) Appl. No.: 08/913,662

(22) PCT Filed: Mar. 19, 1996

(86) PCT No.: PCT/US96/05462

§ 371 Date: Dec. 18, 1997

§ 102(e) Date: Dec. 18, 1997

(87) PCT Pub. No.: WO96/29546

PCT Pub. Date: Sep. 26, 1996

Related U.S. Application Data

(63) Continuation-in-part of application No. 08/406,707, filed on Mar. 20, 1995, now Pat. No. 5,868,084.

(51) Int. Cl.⁷ .............................................. F23J 1/00
(52) U.S. Cl. .................... 110/165 A; 110/165 R; 110/344; 110/257; 110/210; 106/DIG. 1
(58) Field of Search ........................ 110/165 A, 165 R, 110/255, 257, 259, 344, 203, 204, 205, 206, 210, 211, 212, 258; 588/256; 106/DIG. 1

(56) References Cited

U.S. PATENT DOCUMENTS

| | | | | |
|---|---|---|---|---|
| 3,133,804 | * | 5/1964 | Hardgrove | 110/165 R |
| 4,790,250 | * | 12/1988 | Turner | 110/165 R |
| 5,160,539 | * | 11/1992 | Cochran | 106/405 |
| 5,351,630 | * | 10/1994 | Lister et al. | 110/165 A |
| 5,390,611 | * | 2/1995 | John | 110/165 A |
| 5,749,308 | * | 5/1998 | Bachik | 110/344 |
| 5,868,084 | * | 2/1999 | Bachik | 110/257 |

FOREIGN PATENT DOCUMENTS 01286943   11/1989   (JP) .

* cited by examiner

Primary Examiner—Ira S. Lazarus
Assistant Examiner—Ljiljana V. Ciric
(74) Attorney, Agent, or Firm—Jennifer S. Sickler; Gardere Wynne Sewell, LLP

(57) ABSTRACT

A new apparatus and process for the removal of carbon fly ash, whereby carbon removal occurs through oxidation. The ignition of the carbon is accomplished by bulk heating and impingement of a suspended bed of fly ash by a heated oxidizing gas stream, and the desired level of carbon burnout is accomplished in a single chamber apparatus by maintaining combustion conditions. A substantial amount of the carbon removal may occur in the chamber in an environment that maintains temperature and oxygen levels lower than that required for carbon ignition. In one preferred embodiment of the invention, the carbon ignition and burnout may be performed in a single chamber by maintaining zones of varying temperature and oxygen level.

14 Claims, 6 Drawing Sheets

APPARATUS AND PROCESS FOR CARBON REMOVAL FROM FLY ASH

This is a continuation-in-part of U.S. patent application Ser. No. 08/406,707 filed Mar. 20, 1995, now U.S. Pat. No. 5,868,084, issued on Feb. 9, 1999.

BACKGROUND OF THE INVENTION

Coal-fired power plants and other industrial facilities produce large amounts of coal ash, commonly known as fly ash. Fly ash is a waste product of the coal burning process, and must be disposed of properly due to environmental regulations. The large amounts of fly ash produced yearly in the United States, therefore, pose a significant disposal burden for industry. Although fly ash may be characterized as a waste product by some industrial facilities, a beneficial use of fly ash as an additive for concrete has been well established, provided the fly ash does not contain excessive amounts of residual carbon left over from the coal burning process. Large volumes of low carbon fly ash may be used as a pozzolonic material in concrete mixtures, both as a partial Portland cement replacement and as a mineral additive. The use of fly ash increases the quality of the product by adding strength, increasing sulfate resistance, and enabling more economical concrete production. However, the use of fly ash containing excessive amounts of carbon is unacceptable.

Many coal-fired power plants produce fly ash with low amounts of residual carbon, referred to as Loss-On-Ignition or LOI. However, numerous power plants and other facilities produce fly ash with LOI levels above that which should be used in concrete. This high LOI fly ash can be converted to a saleable product, if the amount of residual carbon is reduced to or below acceptable carbon levels. Typically, LOI levels of about 3% or below are acceptable for fly ash to be used as a concrete additive.

Numerous processes for the removal of carbon have been proposed or employed. For example, carbon reduction in fly ash by electrostatic separation has been described in an article by David R. Whitlock, entitled "Electrostatic Separation of Unburned Carbon From Fly Ash" of International Separation Systems, Inc., incorporated by reference herein. The article proposes employing an electrostatic process involving contact charging separators. This is one of the two basic electrostatic processes for dry particle separation. A more conventional electrostatic process involves a rotating drum corona-type separator, but it is impractical for carbon reduction in fly ash.

Another means to separate carbon from fly ash by flotation with tall oil and kerosene has been attempted. However, this method has not proven economical due to the large capital equipment and operating expenses incurred in such processing. Mechanical screening and air classification methods have also met with only limited success. Relatively large amounts of fly ash is not suitable for processing according to these methods due to the methods' limitations on the size and weight distribution of fly ash that can be processed.

Another method is described in U.S. Pat. No. 5,390,611 to Richard E. John, which is incorporated by reference herein, where the fly ash is radiatively heated using electrical means in a rectangular channel and pulled through the channel by feed screws. A small volume of air and additional oxygen is fed into the channel through the feed screws to aid in ignition of the carbon in the fly ash. This method has met with only limited success due to low volumes of useable fly ash that is produced.

Other work has centered on the use of fluidized bed combustor means to remove carbon from fly ash. In the paper "Beneficiation of Fly Ash by Carbon Burnout" by J. S. Cochran and T. J. Boyd, incorporated by reference herein. This method suffers from high sensitivity to the variability in ashes from different sources, owing to significant differences in fluidization and mixing characteristics, auto-ignition temperatures, reaction times, and propensity to form sintered agglomerates. In addition, this approach advises the use of large and sophisticated air/handling and distribution systems that also employ gas particulate separators. The operation and control of the process involves precision and allows for little variability in the individual operating parameters without significant effect on others.

Similarly, U.S. Pat. No. 5,160,539 to Cochran, incorporated by reference herein, reveals a method and apparatus for burning carbon from fine particles of fly ash in a dry, bubbling fluid bed of previously introduced fly ash particles. The method also has a propensity for causing sintering and agglomeration of the fly ash, which is undesirable in fly ash to be used in concrete.

U.S. Pat. No. 4,663,507 to Trerice, incorporated by reference herein, discusses a method and apparatus for reducing and measuring carbon content in fly ash that employs microwave energy to induce combustion of the carbon. U.S. Pat. No. 4,705,409 to Trerice, incorporated by reference herein, is a division of U.S. Pat. No. 4,663,507.

German Patent No. 2,611,213 to Steag AG, incorporated by reference herein, discusses making high quality clinker bricks from fly ash and clay, where the fly ash is initially roasted in the presence of a fuel such as coal dust or fuel gas. An external fuel source is used for the burnout operation.

Soviet Patent No. 734,162, incorporated by reference herein, discusses a process for thermally treating fly ash to reduce its carbon content which uses a solid heat carrier such as quartz sand and creates aggregates of fly ash, rather than fine particles.

Japanese Patent No. 57,179,067 to Kobe Steel KK, involves sintering of fly ash granules to form a lightweight aggregate, rather than fine particles. Japanese Patent No. 57,100,972 to Kobe Steel KK, also discusses a method for sintering fly ash granules.

The technology discussed in the above references leaves unsatisfied a need by industry for an apparatus and method for reducing carbon in fly ash that is simpler and more affordable to build and operate. Such an apparatus would, for example, eliminate the need for sophisticated control equipment and eliminate use of costly gas/particulate separators. An apparatus is also needed that solves the problem of sintering of the fly ash to form agglomerates without adversely affecting other physical properties of the fly ash for use in concrete. Further, an apparatus is needed that sufficiently meets the volume output requirements of the concrete industry for fly ash use as a pozzolonic admixture.

SUMMARY OF THE INVENTION

The present invention is directed to a new method and apparatus for removing carbon from fly ash. In a preferred embodiment, the method comprises the steps of transporting a bed of fly ash through an ignition chamber; contacting the fly ash in the ignition chamber with an oxygen-containing gas at a temperature that is at least the ignition temperature of carbon for a time sufficient to ignite the carbon in the fly ash; transporting the bed of fly ash and ignited carbon to a burnout chamber; maintaining carbon combustion in the burnout chamber at combustion-sustaining gas temperature and oxygen levels for a time sufficient to reduce the carbon content of the fly ash to a desired level; and recovering the fly ash from the burnout chamber. In another embodiment, both ignition and burnout occur in a single chamber. In the ignition step, the method preferably impinges an upwardly flowing, oxygen-containing gas stream against a bed of said fly ash at a plurality of locations along the undersurface of said bed so as to ignite at least a portion of the carbon content of said fly ash at said plurality of locations, and the conditions of such contact are maintained so as to avoid lofting and carry over of the fly ash into the gas stream.

The apparatus of the invention includes a vessel, at least one support for a bed of fly ash moveably positioned within the vessel and constructed so as, in an ignition position, to allow impingement of an oxygen-containing gas stream against said bed of fly ash at a plurality of locations along the undersurface of said bed, and means for impinging said gas stream upwardly against said bed of fly ash while avoiding lofting and carry over of the fly ash into the gas stream.

In a preferred embodiment, the apparatus of the present invention is directed to a vessel having an ignition chamber and a burnout chamber; at least one support for a bed of fly ash moveably positioned within the vessel and constructed to allow passage of an oxygen-containing gas stream to contact the bed of fly ash; means for moving the support containing a bed of fly ash through the ignition chamber and the burnout chamber; and a conduit in fluid communication between the ignition chamber and the burnout chamber for transporting oxygen-containing gas from the ignition chamber to the burnout chamber to contact the beds of fly ash in each chamber. An alternative embodiment of the invention involves attaching the fly ash support directly to an ignition conveyor that travels through the ignition chamber and burnout chamber.

The present invention results in an efficient, economical system for removing carbon from fly ash. Among many advantages, other than those mentioned elsewhere herein, of the preferred embodiment is the use of two processing chambers instead of one. This allows, after carbon ignition, the majority of carbon burnout to occur in a separate environment that involves relatively lower levels of temperature and oxygen in the oxidizing gas stream for continued carbon burnout. This takes advantage of the self-sustaining carbon combustion properties of the carbon in the fly ash to accomplish economical processing. Another advantage of the present invention is the reduction or elimination of sintering problems.

Still other objects, features, and advantages of the present invention will be apparent from the following description of the preferred embodiments, given for the purpose of disclosure, and taken in conjunction with the accompanying drawings.

BRIEF DESCRIPTION OF THE DRAWINGS

FIG. 6a is a schematic of a control unit for varying the temperature, flow rate and oxygen level of the gas flow within the multiple zones in a single chamber.

DESCRIPTION OF THE PREFERRED
EMBODIMENT OF THE INVENTION

Figure 1:
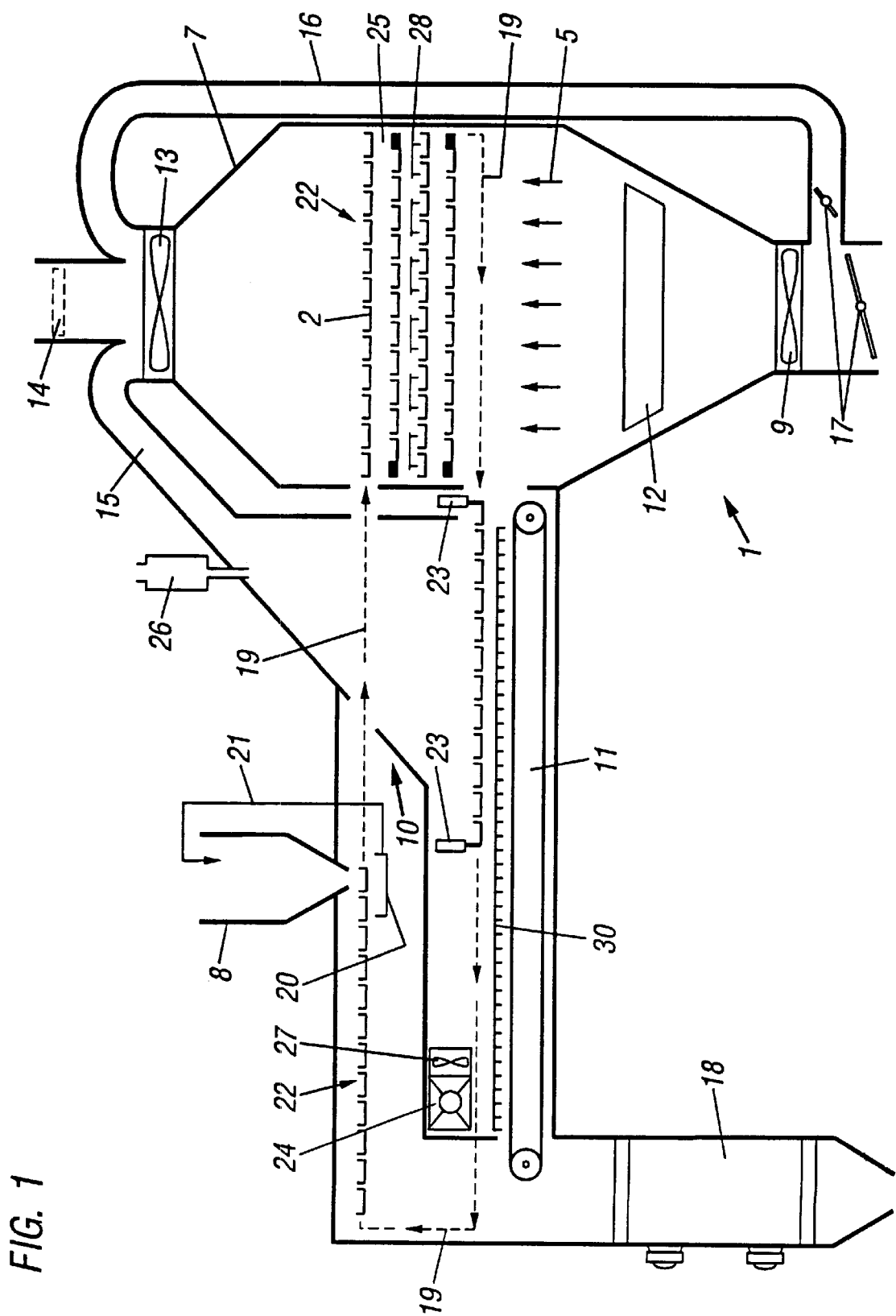
FIG. 1 is a schematic of a preferred embodiment of the apparatus showing a vessel with an ignition chamber and a burnout chamber and multiple fly ash layers suspended in racks that are passed through the ignition chamber at the same time.
Figure 2:
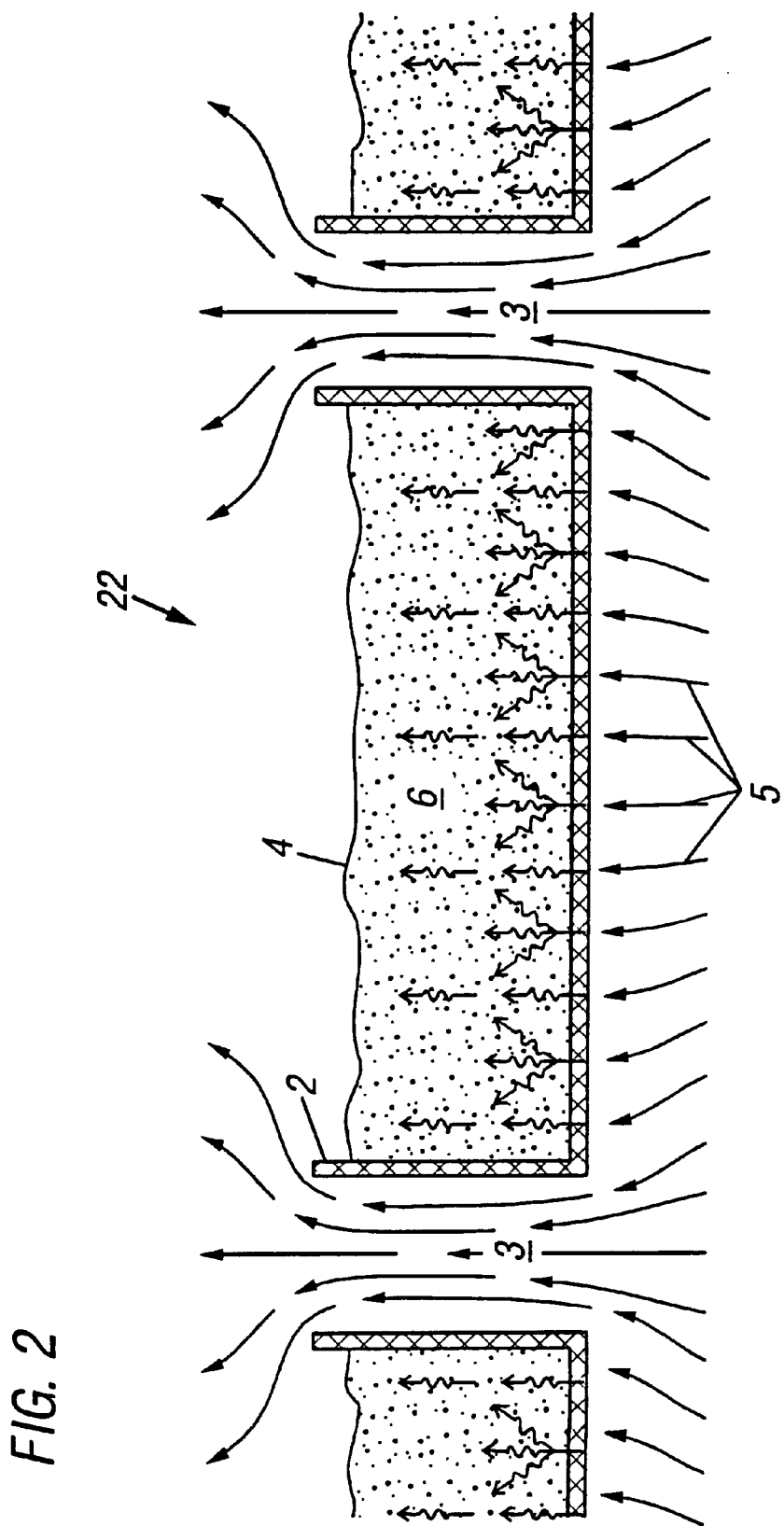
FIG. 2 is a partial schematic of a preferred embodiment of the supports employed in the practice of this invention showing suspension of a fly ash layer in channels in the oxidizing gas stream.

The present invention is directed to a new apparatus 1 for reducing carbon in fly ash. A preferred embodiment of the present invention is shown in FIG. 1, where a carbon removal vessel comprises an ignition chamber and a burnout chamber. As best seen in FIG. 2, fly ash 6 is held in supports 2. Referring again to FIG. 1, supports 2 containing the fly ash are positioned within the apparatus to allow carbon ignition to occur in the ignition chamber 7. The ignition chamber 7 is preferably rectangular around its horizontal circumference, but may be of any shape that is large enough to accommodate the supports 2. One or more supports 2 may be used. The supports 2 are preferably connected in a grouping arrangement or rack 22. In this embodiment, the supports 2 are preferably held together at each end with a rod or other device that runs the length of the ends, substantially parallel to each other. The rods may be attached to side or bottom of the supports or in any other innumerable methods. The design of the support connectors is within the scope of those of ordinary skill in the art. The rack 22 is transported through the ignition chamber 7, and following ignition, from the ignition chamber 7 to the burnout chamber 10 by the ignition conveyor 19. The gas passage gaps 3 are preferably accomplished by the spacing of the supports 2 on the rack 22. The individual supports 2 on each rack 22 are preferably placed to allow the gaps 3 in one rack 22 to occur directly below the centerline of the individual support 2 of the next rack 22 above it, while in the ignition chamber 7. This arrangement results in an advantageous gas flow arrangement for impingement, as the gaps between the supports 2 of every other rack 22 are offset.

The supports 2 are loaded at the beginning of the process preferably by loader 8. Loading may be accomplished by any means suitable for the delivery and distribution of fly ash in the supports 2 that is gradual enough to avoid excessive fall-through or escape of the fly ash from the supports 2 during loading and is preferably a hopper. One preferred embodiment of the invention includes a collector 20 placed directly beneath the supports 2 during ash loading that will collect fallen ash and provide part of a means 21 for returning any ash that has fallen or escaped from the supports 2 during loading. In another preferred embodiment, a flat barrier or plate 20 could be placed directly beneath the supports 2 during ash loading to prevent ash fall through by enabling a bridging effect of the ash over the open areas of support 2, and means 21 could be a mechanical or pneumatic device for returning any ash that does fall through.

Following support 2 loading with fly ash, the racks 22 are transported into the ignition chamber 7 by a conveyor 19 or other movement device. The conveyor 19 may be of any type commonly known in the industry that is capable of transporting the racks 22 in a controlled, relatively vibration and shock-free manner while maintaining a substantially constant vertical orientation of supports 2. The design of such a conveyor 19 is well within the scope of those of ordinary skill in the art.

At the ignition chamber 7, the racks 22 join other racks 22 in a vertical stack arrangement that preferably maintains a particular vertical spacing 25 between the racks 22. The number of racks 22 present at any given time in the ignition chamber 7 may be varied and is limited, among other things, by the space available in the chamber and the maximum allowable pressure drop through the successive racks 22 as dictated by the choice and limitations of the gas handling and distribution system. In other words, the oxidizing gas stream preferably is able to move through all the racks at a rate and temperature that sustains ignition. Another variable in determining the number of racks 22 to place in the chamber 7 is the amount of space desired between the racks 22. Preferably one to ten racks are used, and more preferably three to six racks, but the most preferred embodiment utilizes four or five racks.

Means 28 for raking or physically disturbing the upper portions of the fly ash layers may also be employed preferably after at least low level ignition has occurred. This raking means 28 may be any fixed or moveable type of device that is capable of imparting a physical disturbance to the upper fly ash layer. The raking means 28 is a bar with downward pointing pins in the preferred embodiment. The disturbance of the upper layer of fly ash (preferably about the top half of the ash) after low level ignition has occurred helps to retard any sintering of the extreme upper ash layer and facilitates carbon dioxide removal from the ash layer that is created during carbon combustion.

Timing of the movement of the racks 22 into and out of ignition chamber 7 is a function of the desired production rate and oxidizing gas temperature (which affects ignition time). Time in the ignition chamber is preferably in the range of about 1.0 to about 6.0 minutes. In one preferred embodiment, the four racks 22 in the ignition chamber 7 are stationary in one position for approximately one-fourth of the total gas impingement exposure time, whereafter they simultaneously move downward and come to rest in the next lower position, maintaining the same approximate spacing 25 throughout. For different numbers of racks, different fractions of the total contact time would be spent in each of the corresponding number of positions. Alternative embodiments utilize continuous movement of the racks 22, while maintaining desired spacing 25. After the lowest rack 22 reaches the last position in the chamber 7, it is transported by conveyor 19 out of the ignition chamber 7 and into the burnout chamber 10 where it is unloaded.

In the preferred embodiment of the invention, unloading of the ignited fly ash from the supports 2 is accomplished by a means 23 for mechanically vibrating the rack 22, with assistance from the force of the gas from the burnout chamber gas distributor 15. These forces negate the fly ash bridging effect over the open areas of the supports 2 and facilitate fall-through of the ash from the supports 2 down to the surface of a burnout receptor 11. Other commonly available means 23 may be employed as well, such as mechanically dumping, pushing or otherwise forcing the ash out of the supports 2. In one embodiment, means 23 could be a tripping rod that strikes and rotates a fixed extension (not shown) of the support 2. The burnout receptor 11 may be a tray, a box, a conveyor or any number of things that will collect the fly ash. Preferably the receptor 11 is a conveyor, such as an apron-type conveyor.

The gas stream 5 is accelerated into the ignition chamber 7 by a gas moving device 9 such as a fan, regenerative blower, or compressor assembly 9 and into the ignition chamber 7 where it may be heated by a heater 12. Alternatively, the gas may be heated first, either directly or indirectly, before it passes into the ignition chamber 7. Gas heating may be accomplished by any means commonly known to the industry, and may include direct or indirect heating means. The heated gas stream 5 is directed substantially vertically in the ignition chamber 7 and impinges on successive racks 22 of fly ash layers in the suspension channels 2. Additional draft induction through means such as fans 13 may be employed to aid in maintenance of gas flow and dynamic pressure of the gas as it impinges and passes each rack 22 of supports 2 and to aid in venting of the gas through exhaust 14, the burnout chamber gas distributor 15, and distribution of the gas through gas recycle loop 16. From the recycle loop 16, the gas is reintroduced to the ignition chamber 7 for reuse as oxidizing impingement gas 5. Means such as a damper 17 may be used to control the volume of recycled gas through the gas recycle loop 16. Another damper 17 may be used to control the intake volume of gas into the ignition chamber 7.

After passing through distributor 15, gas is introduced to the burnout chamber 10 where, among other things, it assists with the unloading of the ignited fly ash from the supports 2. Once the ignited fly ash is unloaded from the supports 2 onto the burnout receptor 11, carbon burnout continues due to exposure to the hot gas. A means 26 for supplemental heating of this gas may also be used to maintain a necessary or desired gas temperature and to supply additional make-up gas. This supplemental heating means 26 may be of any means commonly known in the industry, but is a common self-contained direct-fired burner in the preferred embodiment and may be attached anywhere in the burnout chamber 10. The burnout chamber gas may be exhausted from the burnout chamber 10 by any device commonly known in the industry, but is an exhaust port 24 in the preferred embodiment. A draft induction fan 27 also may be employed to aid in efficient gas distribution and discharge from the burnout chamber 10.

If the burnout receptor used is a conveyor, the travel rate of the burnout conveyor 11 may be adjusted to provide the desired residence time of the fly ash in the burnout chamber 10 to accomplish a preferred level of carbon removal. Also, in coordination with the temperature level of the gas in the burnout chamber 10, the travel rate of the burnout conveyor 11 may need to be decreased or increased as the temperature of the gas increases or decreases, respectively. In the preferred embodiment, assuming about 7% carbon in the incoming fly ash stream, the fly ash from the racks 22 will spend from about 6 to about 9 minutes in the burnout chamber 10 for continued carbon combustion. Carbon combustion may be continued until essentially all the carbon is removed. Preferably, combustion is continued until the fly ash contains about 3% carbon by weight or less.

Means 30 for raking or stirring the ignited fly ash in the burnout chamber 10 is provided to enable maximization of exposure of the ignited carbon particles to the oxidizing gas. This means 30 may be any device commonly known in the industry that will separate, rake or stir the ash, and in the preferred embodiment is a fixed grid with pins that protrude downward vertically into the ignited layer of fly ash, enabling a raking of the bed of fly ash to occur as the fly ash is transported on the burnout conveyor 11.

Referring to the drawings, FIG. 2 shows a partial schematic of a preferred embodiment of the supports 2 for the fly ash layer 6 in the oxidizing gas stream 5, and the gas passage gaps 3 utilized for gas restriction and flow-by. The supports 2 may be constructed of any porous and/or gas permeable type of material that is capable of withstanding a high temperature oxidizing environment, while still providing adequate structural support for the ash layer 6. In addition, the supports 2 are preferably constructed with sufficient gas permeability to enable a maximum fly ash gas impingement area, and is also preferably constructed to avoid escape of the fly ash, particularly during transport. Numerous materials and devices commonly known in the industry may be employed for the supports 2, but the most preferred embodiment utilizes a #10 wire mesh made with about a 0.025 inch diameter wire, providing about a 56.3% direct open area for gas impingement. Direct open area is the surface area of the support that is open, such that gas may pass through it unimpeded to contact the bed of fly ash. This design enables the fly ash 6 to be held in suspension after loading, yet maintains a high (56.3%) direct open area for oxidizing gas impingement.

Combinations of different numbers of wires per square inch (mesh) and different wire diameters yield a range of specific net open areas. The width of each individual opening in the mesh may be selected to maximize net percentage direct open area, while minimizing the width of each individual opening. The net percentage direct open area can range from 1–99%. A preferred range of direct open area is 40%–80%, and a more preferred selection is 56.3%. The range of widths for each individual opening is preferably from approximately 0.0008 inches to approximately 0.2 inches and in the preferred selection is 0.075 inches. A combination of more than one mesh in sequence may also be used.

Furthermore, in an alternative embodiment of the invention, a rack 22 is comprised of channels 2 without the above described gas passage gaps 3. In this embodiment, gas passage through the rack 22 is achieved by leaving certain supports 2 empty. Preferably, every other support 2 is left empty. In addition, in yet another alternative embodiment of the invention, each rack 22 is comprised of one flat sheet of mesh or other suitable material. Fly ash 6 is then spaced intermittently on the rack 22 to allow appropriate gas flow through the rack 22.

The supports 2 may be made of any material commonly known to be suitable for use in high temperature oxidizing environments, and is stainless steel in the most preferred embodiment. Other suitable support 2 materials would include perforated metal (preferably stainless steel), perforated ceramic materials, expanded metal, punched, slotted, drilled or grooved metal, and a variety of refractory materials. When wire mesh is used, it is preferably fashioned in channels 2, as shown in FIG. 2, which permits intermittent gas passage gaps 3. The gas passage gaps 3 enable, among other things, the oxidizing gas 5 bypassing the fly ash 6 and the gas 5 impinging on the fly ash 6 to maintain continuous flow and effective heat transfer. The width of the gas passage gaps 3 is tailored to maintain a preferred amount of gas stream restriction which optimizes the gas flow rate to stabilize the dynamic pressure of the oxidizing gas stream 5 impingement on the fly ash to prevent lifting the fly ash. In one preferred embodiment, the width of the gaps 3 is about 0.5 inches. Numerous types of supports 2 may be used, including other designs made of wire mesh, as discussed above.

In one preferred embodiment, nineteen supports 2 are connected in a substantially parallel fashion along their lengths, with a structural support such as a rod running along the ends of the channels 2 at each end as described above. The channels 2 are approximately 3 inches wide, about 1 inch in height, and about 5.54 feet long. The rack created by the connection of the nineteen channels 2 has the dimensions of approximately 5.54 feet by 5.54 feet. The ends of the channels 2 are preferably closed. In another preferred embodiment, twelve supports 2 are connected in a substantially parallel fashion along their lengths, with a structural support rod running along the ends of the channels 2 at each end. The channels 2 are approximately 3 inches wide, about 1 inch in height, and about 42 inches long. The rack created by the connection of the twelve channels 2 has the dimensions of approximately 44 inches by 44 inches.

In theory, any width or height or length of channels 2 may be used. Such parameters are typically chosen to accommodate the processing of a chosen volume of fly ash. The first preferred embodiment discussed above involves the processing of about 5 tons per hour of incoming high carbon fly ash. The second involves the processing of about 2.5 tons per hour.

Rollers or other moving devices may be attached to the structural supports of the racks 22 to allow the racks 22 to be moved along rails or other devices for movement on or by the conveyor 19.

An even, properly directed gas stream 5 is preferably employed that impinges directly on the fly ash layer 6. Control of the direction, uniformity, and dynamic pressure of the gas stream may be aided by proper spacing and orientation of the gas passage gaps 3. In the preferred embodiment, the gas stream 5 direction is depicted as vertical, flowing from below the beds upward through the beds. It will appreciated by those skilled in the art, however, that the gas stream 5 direction may vary greatly, and, in fact, may be in any direction. The oxidizing gas stream 5 may be one of many compositions commonly known in the industry that is oxygen-bearing, with one preferred embodiment of the invention utilizing common air. In another preferred embodiment, the oxygen-bearing gas is comprised primarily of $O_2$ and inert gases. In yet another preferred embodiment, pure $O_2$ is used. Air containing supplemental oxygen enrichment may also be used. In the ignition chamber, the gas stream preferably has about 5% to about 100% $O_2$ by volume. In the burnout chamber, the gas composition by volume may range from about 1% to about 100%. The oxidizing gas stream 5 is heated to a temperature level at or above that required to ignite and combust carbon with oxygen. This ignition temperature level is a function of the amount of available oxygen as a concentration percent, and is at a minimum approximately 750° F. to 800° F. at atmospheric pressure, if common air is used. Other temperatures may be used, provided they are above that required to support carbon combustion with the gas stream chosen. The selected temperature level will affect the time required to achieve carbon ignition and the level of carbon ignition saturation in the fly ash layer. In the preferred embodiment of the invention, air is used and heated to a range of from about 1300° F. to about 1800° F., more preferably from about 1500° F. to about 1700° F., and most preferably to approximately 1650° F. to 1700° F.

Low level carbon ignition is achieved in about a 1-inch ash layer height 4 after approximately 2 minutes, with good ignition saturation occurring after an additional approximately 75 seconds of continued gas impingement. The support 2, as described above, is preferably constructed of #10, 0.025 inch wire mesh channels that are about 3 inches wide, with gas passage gaps 3 of about 0.5 inches, but can be of other combinations based upon the desired temperature, gas composition, and flow rate of the oxidizing gas and the desired ash layer height 4. The flow rate of the oxidizing gas (when using air) is preferably between about 50 and about 95, and more preferably between about 60 and about 80, and most preferably between about 65 and about 75, standard cubic feet/minute per square foot of ash impingement area. In one preferred embodiment using air, this flow rate is 70 standard cubic feet/minute per square feet of ash impingement area at 1700° F. The proper selection of these parameters is well within the skill of the ordinary engineer from this disclosure, and can be adjusted to suit the desired production output goals. This may be easily done by adjusting the impinging gas flow rate to a maximum value that avoids ash lofting and carryover into the gas stream, after selecting the ash layer height 4 and the spacing and orientation of the gas passage gaps 3 to meet desired fly ash processing rates.

After achieving carbon ignition, exposure of the fly ash layers to the oxidizing gas stream may be continued to complete carbon burnout. This exposure may continue in the ignition chamber for as long as necessary to accomplish the desired level of carbon burnout. However, preferably the fly ash containing the ignited carbon is not exposed to the same level of oxidizing gas stream for continued carbon burnout, but is allowed to burn or smolder at a reduced combustion rate thereby taking advantage of its self-sustaining carbon combustion properties for economy purposes. This is accomplished by either reducing the flow rate and/or the temperature of the oxidizing gas stream or utilizing exposure to a recovered and/or recycled gas stream. This can be done within a single chamber in a single vessel, or within two or more separate chambers within a single vessel or within two or more zones within a single chamber. Alternatively, it can be done by transferring the smoldering fly ash between or among a plurality of separate vessels. The preferred embodiment of the invention, as described above, utilizes a second chamber 10 that maintains conditions sufficient for continued carbon combustion of the ignited fly ash. The second chamber 10 does not utilize direct gas impingement on the fly ash suspended in a gas stream. Rather, a recovered/recycled gas stream is preferably introduced to the chamber 10. Further, fly ash exposure to this oxygen-bearing gas may be enhanced by a means 30 that rakes or stirs the ash. The ignited carbon usually continues to burn at a rate proportional to the temperature and oxygen exposure.

Means 18 for cooling the fly ash 6 may be any that are commonly known in the industry, which are well known to those skilled in the art. In one preferred embodiment, the means 18 is a solids cooler such as a bulk flow heat exchanger. In another preferred embodiment, means 18 may be an air cooler, using a second apron-type conveyor with cross flow fans and perhaps rakes to stir the ash and enhance exposure to cooling air.

Once the desired carbon burnout has occurred, the fly ash 6 is discharged from the burnout chamber 10, preferably by the burnout conveyor 11, or if no conveyor 11 is used, then the ash may be discharged. Any commonly available means for discharging fly ash from the burnout receptor 11 such as vibration, air-assisted, or mechanical may be employed in all embodiments, and are well within the scope of the ordinary engineer. The discharged fly ash may then be air cooled or force cooled. Alternatively, it may be allowed to cool by exposure to the atmosphere.

Figure 3:
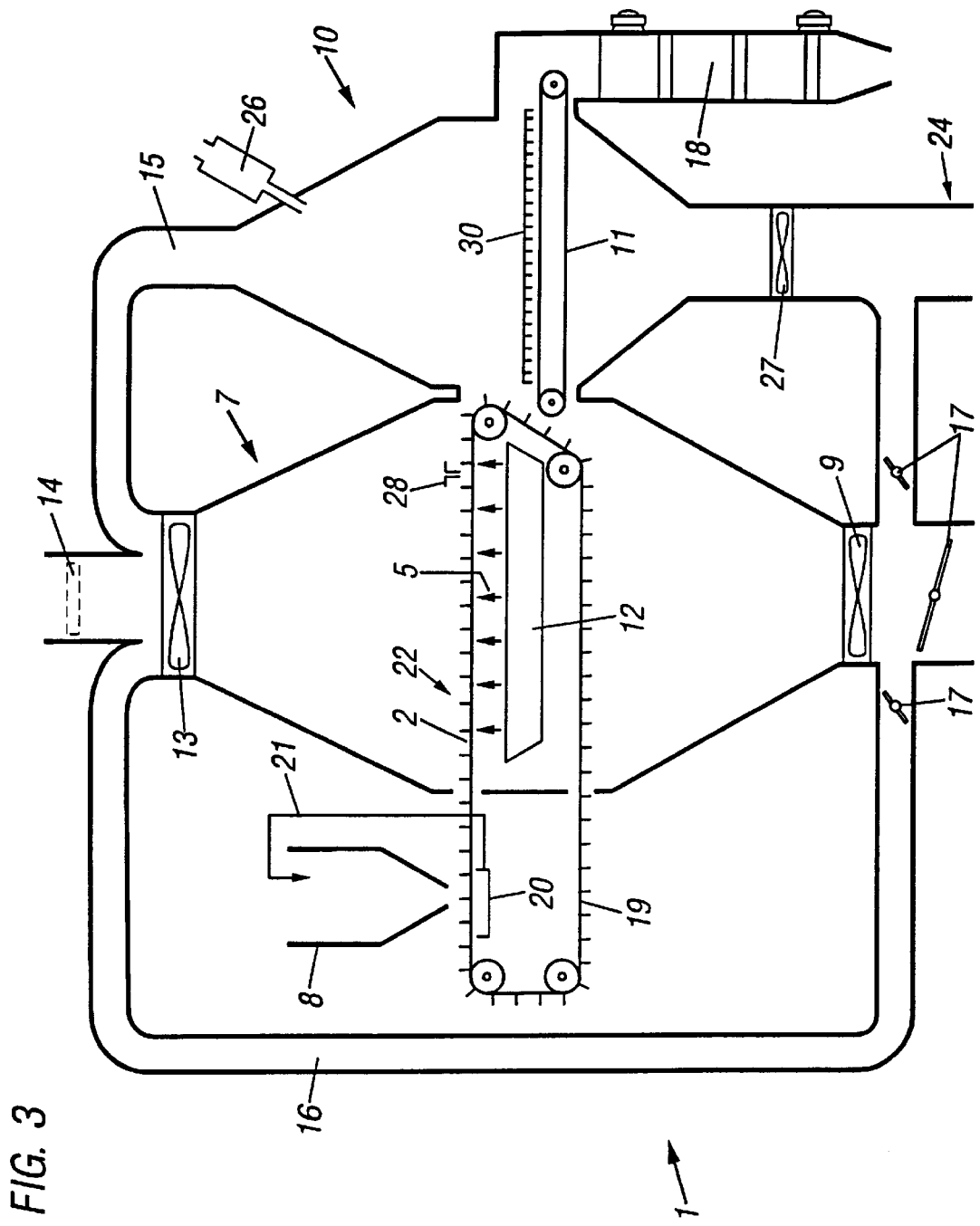
FIG. 3 is a schematic diagram of an alternative preferred embodiment of the invention, wherein the fly ash is suspended in channels connected to a conveyor that may move continuously or intermittently through the ignition chamber.

An alternative embodiment of the invention, as shown in FIG. 3, comprises the same arrangement as the preferred embodiment of FIG. 1, except that the supports 2 are connected directly to the ignition conveyor 19 with the heated oxidizing gas stream 5 making a single pass through the suspended fly ash layers 6 before they are dumped onto the burnout receptor 11 after ignition. The ignition conveyor 19 returns the supports 2 to the loader 8 for reloading with fly ash. The conveyor 19 may operate with continuous or intermittent motion. In addition, this arrangement may utilize a means 28 for upper ash layer raking that is fixed or moveable. Either a fixed or moveable means 28 for raking or disturbing the upper ash layer may be used in any embodiment of the invention.

Figure 4:
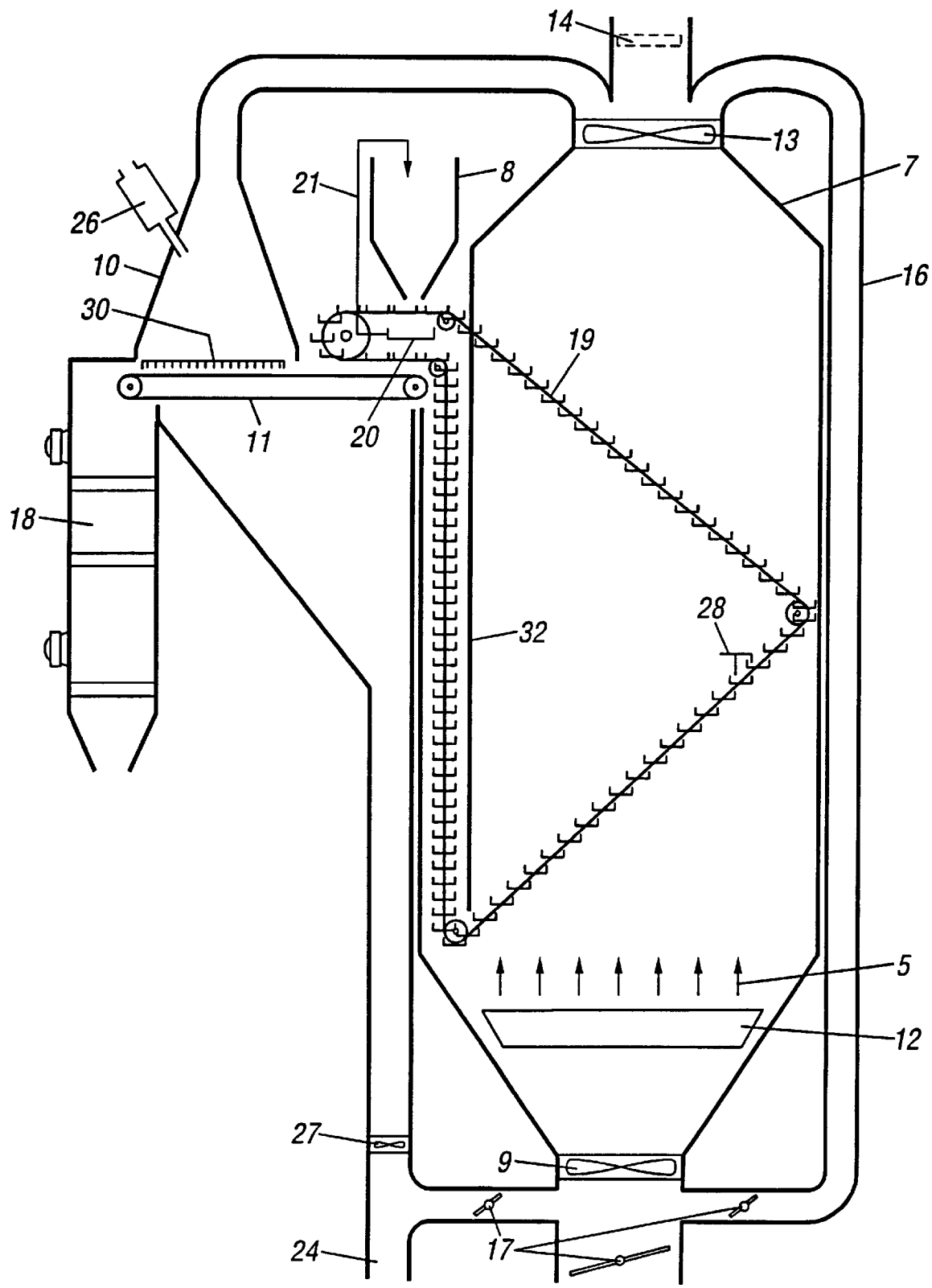
FIG. 4 is a schematic of an alternative preferred embodiment of the invention, wherein the fly ash is suspended in channels connected to a conveyor that travels at one or more angles through the ignition section.

FIG. 4 is another preferred alternative embodiment of the invention, and comprises an apparatus similar to the embodiment of FIG. 3, except that the supports 2 are connected directly to a conveyor 19 that travels at one or more angles through the ignition chamber 7 while maintaining the substantially horizontal orientation of the supports 2, thereby enabling multiple passes of the oxidizing gas on fly ash layers to occur. The conveyor angle chosen may be varied from 0° to 90°, but in the preferred embodiment is 45 degrees. The number of angled turns in the ignition chamber 7 may be varied, depending on the chosen size of the chamber and the desired residence time of the supports 2 in the chamber 7. In addition, the alternative embodiment shown in FIG. 4 illustrates a means 32 for allowing a portion of the hot oxidizing gas stream 5 to flow past the ignition chamber 7 and contact the supports 2 in the burnout chamber 10. This means 32 also helps maintain the ignition and combustion of the ignited carbon in the fly ash during travel to the burnout chamber 10. The gas conducted by means 32 into the burnout chamber 10 may assist with unloading of the supports and the maintenance of continued carbon burnout in the burnout chamber 10. Assistance with support 2 unloading occurs when gas flow is directed onto the ash 6 in the supports 2 and is forceful enough to cause fly ash fall-through and carryover.

Figure 5:
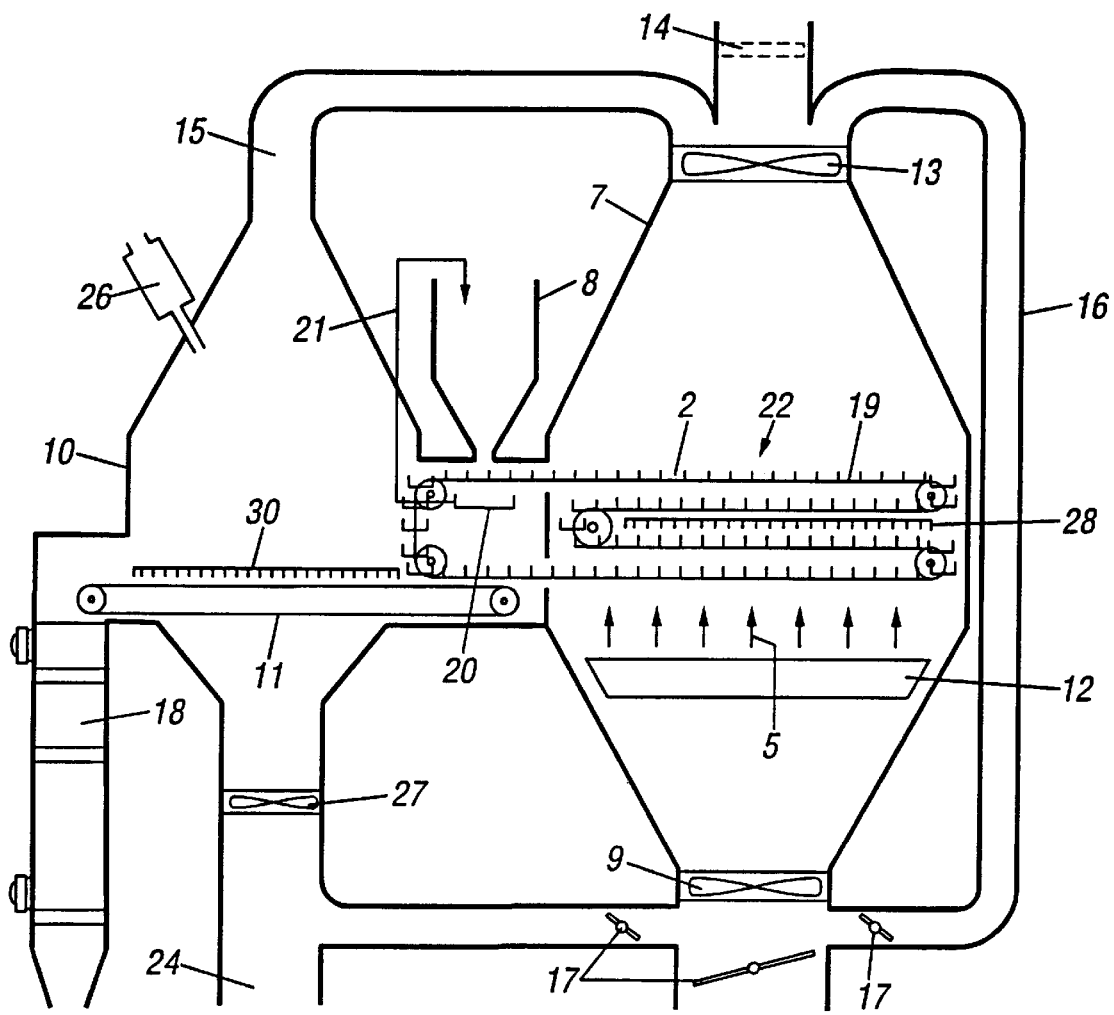
FIG. 5 is a schematic of an alternative preferred embodiment of the invention, wherein the fly ash is suspended in channels connected to a conveyor that travels through the ignition section in multiple substantially horizontal passes.

FIG. 5 is another preferred alternative embodiment of the invention, and comprises an arrangement similar to the embodiment of FIG. 3, except that the supports 2 are connected directly to a conveyor means 19 that makes multiple substantially horizontal passes through the ignition chamber 7 while maintaining a substantially horizontal orientation of the supports 2. This enables multiple impingements of the oxidizing gas on the beds of fly ash to occur. The length and number of horizontal passes in the ignition chamber 7 can be chosen based on the desired chamber size and operating efficiency.

Still yet another alternative embodiment of the invention is one where the supports 2 maintain a substantially vertical orientation on the conveyor 19 in the ignition chamber 7, thereby allowing multiple passes of the oxidizing gas stream 5 to occur for economy purposes. Additionally, an alternative embodiment of the invention may utilize the recycling and reuse of a portion of the gas exhausted from the burnout chamber 10 for ignition chamber 7 use. Control of the volume of burnout chamber 10 gas that is recycled can be achieved by any commonly available means known in the industry, and is a damper 17 in the preferred embodiment.

The preferred method of this invention is a new process for reducing carbon in fly ash. In the preferred embodiment, fly ash with a high carbon content is put into a loader 8 which feeds the fly ash into supports 2 which are part of racks 22. In one preferred embodiment, the width of the loader 8 is coincident with the length of the support 2. Alternatively, a smaller loader 8 may travel back and forth along the length of each supports 2 to provide a relatively even, approximately 1 inch layer of fly ash in each support 2. Preferably, a collector 20 below the loader 8 collects fallen fly ash and recycles it via means 21 to the loader 8. As discussed above, the loader is preferably a hopper, but loading may be accomplished by any means suitable for the delivery and distribution of fly ash in such a manner as to be gradual enough not to facilitate excessive fall-through or escape of the fly ash from the support 2 during loading. The means 21 may be a conveyor or other device for moving solids. Such devices are well known to those skilled in the art. Once a rack 22 of supports 2 has been filled with fly ash, it travels along ignition conveyor 19 to the ignition chamber 7. The conveyor 19 may be of any type commonly known in the industry that is capable of transporting the racks 22 in a controlled, relatively vibration and shock-free manner while maintaining a constant relatively horizontal orientation. The design of such a conveyor means 19 is within the scope of knowledge of one skilled in the art. In one preferred embodiment, four positions are available in the ignition chamber 7 for the racks 22. A rack 22 first enters the ignition chamber 7 at a top position in the chamber 7 and then moves consecutively down the chamber to three lower positions. The time that a rack 22 spends in the ignition chamber 7, may be varied considerably, such as between about 1 and about 20 minutes, more preferably between about 2 and about 10 minutes, and most preferably between about 3 and about 5 minutes. In one preferred embodiment, the time is about 3.5 minutes. The racks 22 spend about one-fourth of their time in the ignition chamber 7 at each of the four positions. In another preferred embodiment, five positions are available in the ignition chamber 7 for the racks 22. A rack 22 first enters the ignition chamber 7 at a top position in the chamber 7 and then moves consecutively down the chamber to four lower positions. The racks 22 spend about one-fifth of their time in the ignition chamber 7 at each of the five positions.

Oxygen bearing gas 5 travels through the ignition chamber 7 at a temperature and flow rate that will ignite the carbon with the oxygen. In the preferred embodiment, the gas stream 5 is accelerated by a gas moving device 9 such as a fan or regenerative blower or compressor assembly into the ignition chamber 7 where it is heated directly by heaters 12. Alternatively, the gas may be heated first, either directly or indirectly, before it passes into the ignition chamber 7. Gas heating may be accomplished by any means commonly known to the industry, as discussed above, and may include direct or indirect heating means. The heated gas stream 5 is directly substantially vertically in the ignition chamber 7 and impinges on successive suspended fly ash layers 6 in the suspension racks 22. Additional draft induction means such as a fan 13 may be employed to aid in maintenance of proper gas flow and dynamic pressure of the gas as it impinges and passes each rack 22 and to aid in venting of the gas through exhaust 14, through recycle loop 16 or through burnout chamber gas distributor 15.

In the ignition chamber 7, the racks 22 are spaced in the preferred embodiment in a vertical stack arrangement that maintains a particular vertical spacing 25. The number of racks 22 present at any given time in the ignition chamber 7 may be varied and is limited by the space available in the chamber 7 and for the other reasons discussed above. Preferably, from 1 to 10 racks 22 are stacked in the ignition chamber 7, more preferably from 3 to 6 racks, but in the most preferred embodiment, 4 or 5 racks are stacked.

Once the fly ash in a rack 22 has been subjected to at least low level ignition, it can be raked or physically disturbed by raking means 28. Means 28 disturbs approximately the top half of the fly ash layer. This raking means 28 may be any fixed or movable type of device that is capable of imparting a physical disturbance to the upper fly ash layer. In the preferred embodiment, the means 28 is a bar with downward pointing pins.

After a rack 22 attains the last position in chamber 7, it is transported by conveyor means 19 out of the ignition chamber 5 and into the burnout chamber 10 where it is unloaded. Unloading of the ignited fly ash from the supports 2 is accomplished preferably by a means 23 for mechanically vibrating the racks 22, with assistance from the force of gas from the burnout chamber gas distributor 15. After passing through distributor 15, a portion of the gas 5 leaving the ignition chamber 7 is introduced to the burnout chamber 10, where, in part, it assists with the unloading of the ignited fly ash from the supports 2. These forces negate the fly ash bridging effect over any open areas of the supports 2 and encourage fall-through of the ash from the supports 2 down to the surface of the burnout receptor 11. As discussed above, other commonly available means for unloading the supports 2 may be employed.

Once in the burnout chamber 10, the fly ash is continually exposed to hot gas 5 transported through the burnout chamber gas distributor 15. The continual exposure to the oxidizing gas stream 5 sustains carbon combustion within the burnout chamber 10. A majority of carbon burnout occurs in the burnout chamber 10 in an environment that preferably maintains less than the temperature and oxygen levels used for carbon ignition in the ignition chamber. Alternatively, a means 26 for supplemental heating of the gas passed into the burnout chamber 10 by the distributor 15 may be used to maintain a specific gas temperature or to supply additional make-up gas. In the preferred embodiment, assuming about 7% carbon in the incoming fly ash stream, the fly ash from the racks 22 will spend from about 6 to about 9 minutes in the burnout chamber 10 for continued carbon combustion. The travel rate of a burnout conveyor 11, if one is used, may be adjusted to provide the desired residence time of the fly ash in the burnout chamber 10. Carbon combustion may be continued until essentially all the carbon is removed. Preferably, combustion is continued until the fly ash contains less than about 3% carbon by weight.

The burnout chamber gas is expelled from chamber 10 by any device commonly known in the industry, but is an exhaust port 24 in the preferred embodiment. A draft induction fan 27 may also be employed to aid in efficient gas distribution and the discharge of the gas from the burnout chamber 10.

While in the burnout chamber 10, the fly ash on the burnout receptor or conveyor 11 is raked or stirred by means 30 to provide for greater exposure of the carbon particles to the oxidizing gas. This means 30, as discussed above, may be any device commonly known in the industry that will separate, rake or stir the ash, and in the preferred embodiment is a fixed grid with pins that protrude downward vertically into the ignited layer of fly ash, enabling a raking of the ash to occur as the fly ash is transported.

When the fly ash reaches the end of conveyor 11, it preferably is dumped into a solids cooling means 18 to allow cooling of the carbon reduced fly ash 6 prior to unloading. However, forced cooling of the fly ash is not necessary in all embodiments of the invention, as discussed above. The cooled fly ash 6 may be off-loaded to a truck, storage silo, barrel, any other type of storage container, or a dump site.

Referring back to the oxidizing gas stream 5, which exits the ignition chamber 7 through induction fan 13, the stream 5 may also be recycled through loop 16 for reuse in the ignition chamber 7. Dampers 17 may be placed periodically through the gas distribution system to control the gas stream flow. The selection and placement of such equipment is well within the skill of the ordinary engineer.

An alternative method of the invention, referring to FIG. 3, comprises the same method as discussed above, except that in the ignition chamber 7 the supports 2 are connected directly to an ignition conveyor 19. In this method, the heated oxidizing gas stream 5 makes a single path through the suspended fly ash layers 6 before the fly ash 6 is dumped onto the burnout receptor 11. The conveyor means 19 may operate with continuous or intermittent motion.

Another preferred alternative method of the invention, referring to FIG. 4, comprises a method similar to the preferred embodiment described above (with respect to FIG. 1), except that the supports 2 are connected directly to an ignition conveyor 19 that travels at one or more angles through the ignition chamber 7 while maintaining substantially horizontal orientation of the supports 2. The oxidizing gas therefore impinges upon the fly ash layers multiple times. As described above, the choice of angles will affect how many passes the gas makes over each layer of the fly ash. Contemporaneously, the oxidizing gas stream 5 may be channeled to the burnout chamber 10 behind a partition 32. Gas conducted by a partition 32 into the burnout chamber 10 may be used to assist with supports 2 unloading and the maintenance of continued carbon burnout in the burnout chamber 10, as discussed above.

An additional alternative preferred method, referring to FIG. 5, comprises a method similar to that described above with respect to FIG. 2, except that the supports 2 are connected directly to conveyor 19 that makes multiple substantially horizontal passes through the ignition chamber 7, allowing multiple impingements of the oxidizing gas on the fly ash layers 6.

Figure 6:
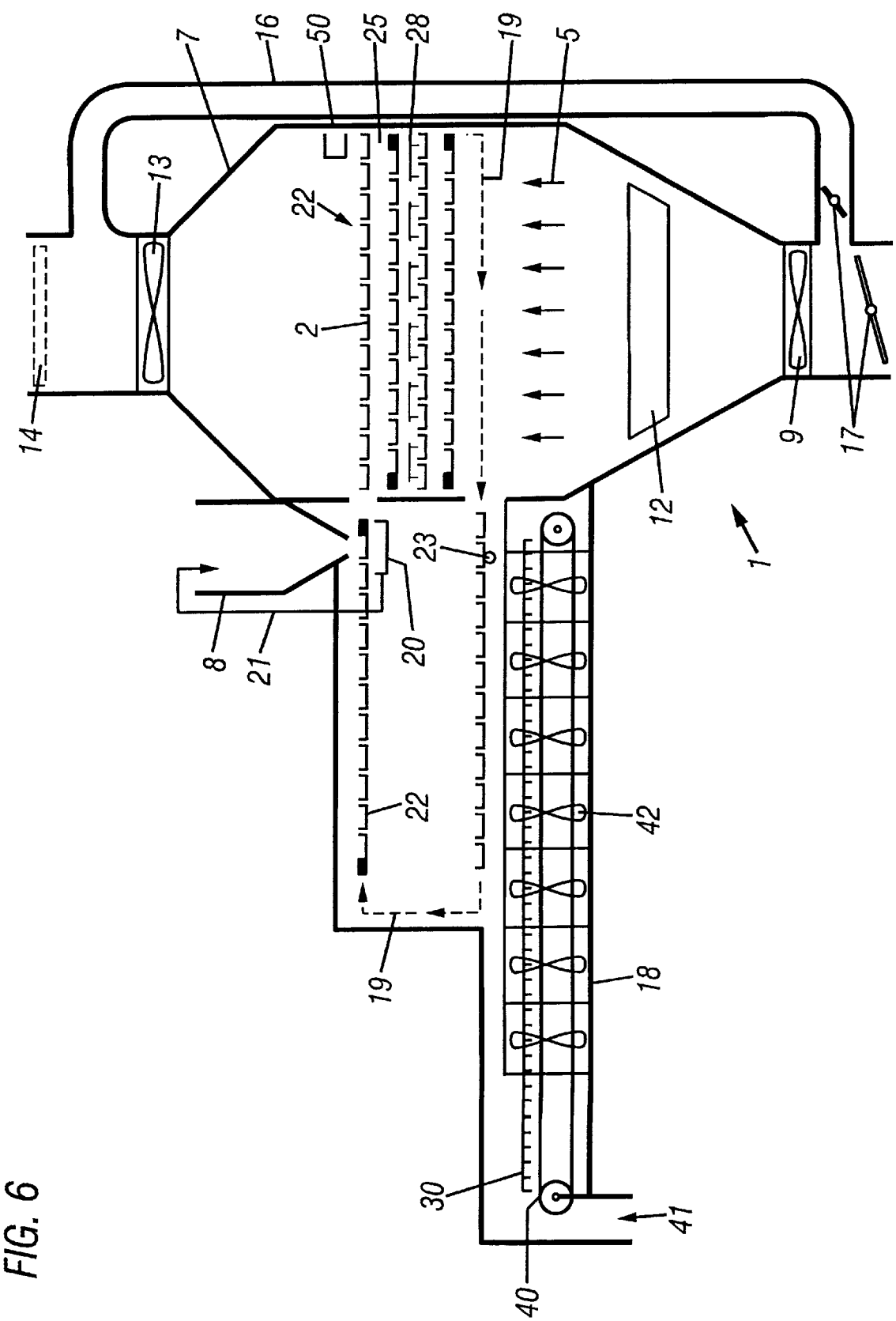
FIG. 6 is a schematic of an alternative embodiment of the invention, wherein both the ignition and the carbon burnout are accomplished within a single chamber.

As mentioned above, the exposure of the fly ash layers to the oxidizing gas stream may be continued within the same chamber as the ignition of the carbon content of the fly ash. FIG. 6 illustrates an apparatus very similar in concept to that depicted in FIG. 1, with the exception that the apparatus of FIG. 6 has only a single chamber 7, rather than the separate ignition chamber 7 and burn out chamber 10 shown in FIG. 1. That is, a separate burn out chamber is optional, although in most cases, separate chambers are preferred to achieve lower operating costs. In the embodiment of FIG. 6, sufficient reduction of the carbon in the fly ash is accomplished while the fly ash is in chamber 7. Residence times in chamber 7 are adjusted accordingly to allow sufficient time for burnout of the carbon to the desired level. Chamber 7 could also be divided into a plurality of zones that utilize reduced or varying levels of oxidizing gas stream volume, oxygen level, and temperature, in order to control the rate of combustion. As seen in FIG. 6a, the control unit 50 has a heat control means 52, an oxygen level control means 54, and a gas flow rate control means 56. Each of these control means can operate independently of the other control means to alter the composition and direction of the intermediate gas stream 60. Each of the other embodiments of the invention may also employ these multizone features. Referring to FIG. 6, the fly ash is unloaded from the supports 2 by means 23 and falls into means 18 for cooling of the fly ash. Means 18 in FIG. 6 is shown as a conveyor 40 which transports the fly ash to a discharge chute 41. Means 18 also includes cross flow fans 42 which circulate cooling air over the fly ash on conveyor 40 as rake 30 stirs the fly ash.

Some common engineering elements such as gauges, valves, controllers and the like are not shown or described except when necessary for the understanding of the invention. For the most part, selection and placement of such equipment is well within the skill of the ordinary engineer. Although the above process and apparatus are described in terms of the above preferred embodiments, those skilled in the art will recognize that changes in the process and apparatus may be made without departing from the spirit of the invention. Such changes are intended to fall within the scope of the following claims.

What is claimed is:

1. A method for lowering the carbon content of a fly ash containing carbon, comprising the steps of:
   (a) forming at least one bed of said fly ash in a single chamber;
   (b) impinging a heated, oxygen-containing gas stream against sad fly ash at a plurality of locations along said at least one bed so as to ignite at least a portion of the carbon content of said fly ash at said plurality of locations; and
   (c) maintaining combustion of said carbon content within the chamber to produce a fly ash product with a reduced carbon content, wherein conditions are maintained so as to avoid lofting and carry over of the fly ash into the gas stream.

2. The method of claim 1 further comprising the steps of:
   forming a plurality of beds of said fly ash;
   transporting said beds through a chamber;
   impinging at least a portion of said gas stream successively against at least two of said beds as said gas stream flows through said chamber.

3. The method of claim 1 in which the flow rate of the gas stream impinging upon the underside of said beds is between about 50 and about 95 standard cubic feet per minute per square foot of ash impingement area.

4. A method for lowering the carbon content of fly ash in a single chamber for fly ash containing more than 3 weight percent carbon comprising the steps of:
   (a) forming a plurality of beds of said fly ash;
   (b) transporting said plurality of beds serially through a chamber in a multiple stage contact relationship to a flowing, oxygen-containing gas stream, thereby creating a plurality of contact stages corresponding with said plurality of beds, whereby said gas stream impinges against said fly ash, and the flow rate of said gas stream is generally less than 95 cubic feet per minute per square foot of ash impingement area so as to avoid lofting and carry over of the fly ash into the gas stream;
   (c) heating said gas stream to a temperature between about 1,300° F. and about 1,800° F. prior to contact with said beds such that, in at least one of said plurality of contact stages, the gas stream ignites at least a portion of the carbon content of said fly ash at a plurality of locations along the corresponding said plurality of beds, said gas stream exiting from said plurality of contact stages as an intermediate gas stream; and
   (d) contacting the fly ash and ignited carbon contained therein produced from said plurality of contact stages with at least a portion of said intermediate gas stream to sustain combustion of said carbon content so as to produce a fly ash product having a reduced carbon content.

5. The method of claim 4 in which said sustained carbon combustion is accomplished by varying the flow rate, temperature, and oxygen levels of said intermediate gas stream.

6. The method of claim 4 in which said sustained combustion is accomplished in said carbon burn out stage by maintaining temperature and oxygen levels which are less than the temperature and oxygen levels utilized for ignition of at least a portion of said carbon content of said fly ash.

7. The method of claim 4 further comprising the steps of:

transferring the fly ash and its ignited carbon from said plurality of beds, after at least one of said plurality of contact stages;

forming a new bed of said fly ash and ignited carbon content; and passing a second oxygen-containing gas stream comprised of said intermediate gas stream in contact with said new bed, so as to accomplish said carbon burn out stage.

8. An apparatus for lowering the carbon content in fly ash comprising:

a single chamber configured to encourage ignition and sustained combustion of at least a portion of the carbon content of said fly ash within said chamber;

at least one bed moveably positioned within said chamber and constructed so as, in an ignition position, to allow impingement of an oxygen-containing gas stream against said at least one bed of fly ash at a plurality of locations along said at least one bed;

means for impinging said gas stream against said at least one bed of fly ash whereby the rate of flow is controlled to encourage ignition and sustained combustion of at least a portion of the carbon content of said fly ash while avoiding lofting and carry over of said fly ash into said gas stream.

9. The apparatus of claim 8 wherein said apparatus further comprises:

a means for moving said support between said ignition position and at least one other position within said chamber, said apparatus being adapted to cause another contact of said gas stream with said at least one bed of fly ash when said at least one bed is in at least one of said other positions.

10. An apparatus according to claims 1 or 9, wherein said chamber is divided into a plurality of zones which correspond with said ignition and at least one other position, wherein said gas stream volume, oxygen level and temperature are varied in said zones to control sustained ignition and combustion.

11. The apparatus of claim 10, wherein said chamber further comprises conduits for gas inflow to and outflow from said chamber.

12. The apparatus of claim 11, wherein a recycle loop for the gas stream is connected from the outflow to the inflow conduit of said chamber.

13. The apparatus of claim 8, wherein a loader device is positioned adjacent to at least one moveably positioned support.

14. The apparatus of claim 8, wherein a cooling device is positioned adjacent to at least one moveably positioned support.

\* \* \* \* \*